No. 865,486. PATENTED SEPT. 10, 1907.
T. H. GANNON.
YIELDABLE GEARING.
APPLICATION FILED MAR. 28, 1907.
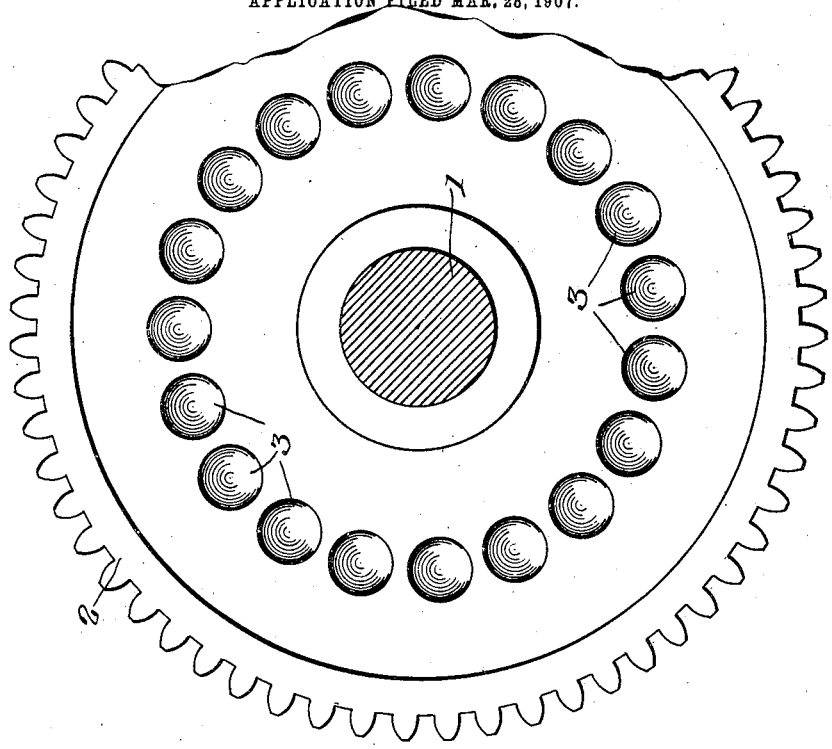
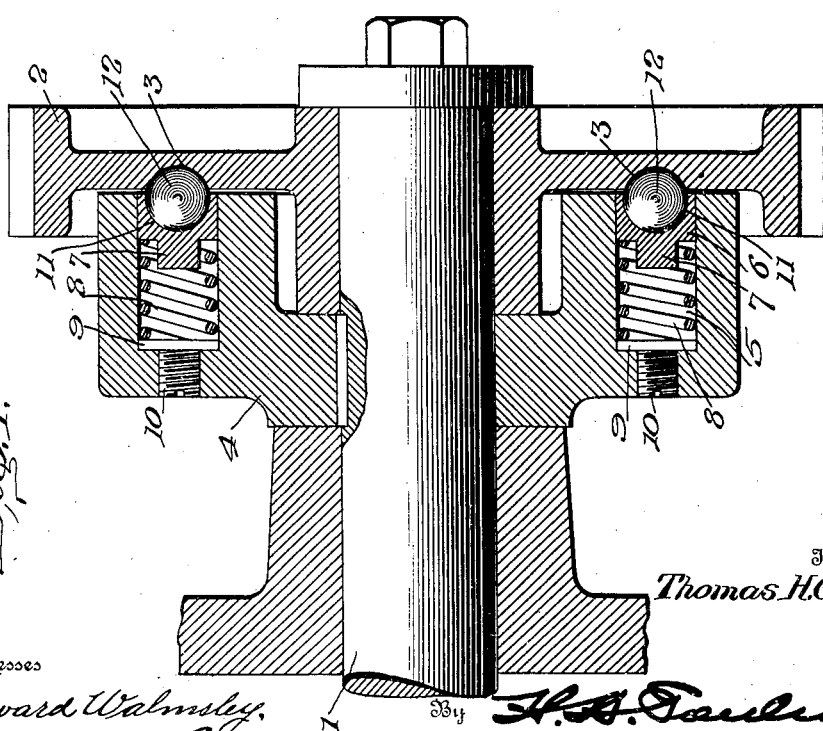
Witnesses
G. Howard Walmsley,
Edward L. Reed
Inventor
Thomas H. Gannon,
By
Attorney

UNITED STATES PATENT OFFICE.

THOMAS H. GANNON, OF SPRINGFIELD, OHIO.

YIELDABLE GEARING.

No. 865,486.        Specification of Letters Patent.        Patented Sept. 10, 1907.

Application filed March 28, 1907. Serial No. 364,985.

*To all whom it may concern:*

Be it known that I, THOMAS H. GANNON, a citizen of the United States, residing at Springfield, in the county of Clark and State of Ohio, have invented certain new and useful Improvements in Yieldable Gearing, of which the following is a specification, reference being had therein to the accompanying drawings.

The present invention relates to yieldable gearing of the type adapted to yield to permit the parts to rotate independently one of the other when subjected to abnormal strain.

The object of the invention is to provide a gearing of this character in which the driving member will be yieldably connected to the driven member by a rotatable locking part adapted to positively lock the members together and causing them to rotate in unison under normal conditions and to yield to permit the driving member to rotate continuously independently of the driven member when the latter is subjected to abnormal strain, the construction of the locking part and its coöperating mechanism being such as to minimize the liability of the locking part binding and refusing to operate or being tardy in its operation; to provide an improved operation of the gearing by facilitating the escape of the locking part from the locking recess, due to the tendency of the rotatable locking part to roll or climb out of the locking recess when pressure is applied thereto; to eliminate the chipping or wearing away of the edges of the locking recesses incident to the use of a non-rotatable locking part; and to improve the construction and arrangement of the gearing to permit the same to be inserted in the ordinary train of gearing.

With these objects in view, my invention consists in certain novel features of construction to be hereinafter described, and then more fully pointed out in the claims.

In the accompanying drawings, Figure 1 is a sectional view taken longitudinally of the shaft; and Fig. 2 is a side elevation of the gear partially broken away.

In these drawings I have illustrated one embodiment of my invention, in which the reference numeral 1 indicates the shaft which is connected with the part or mechanism to be driven and which has loosely mounted on the outer end thereof a gear 2 which is preferably of the usual construction and is provided with a series of recesses 3 in the rear or inner face thereof. These recesses may be of any suitable shape and number, but I prefer that the same should conform to the segment of a sphere and should be of a depth equal to somewhat less than one-half the diameter of the sphere. These recesses are arranged concentric with the shaft and I have here shown them spaced, but a short distance apart and extending entirely around the shaft. A driven or clutch member 4 is rigidly secured to the shaft 1 in the rear of the gear 2 and is preferably provided with a recess adapted to receive the hub of the gear. This clutch member is provided with a series of recesses 5, preferably four in number and extending parallel with the shaft 1 and arranged at a distance therefrom corresponding to the arrangement of the recesses 3. Slidably mounted in each of the recesses 5 is a bearing block or follower 6 having at its inner end a lug or projection 7 about which is coiled one end of a spring 8, the opposite end of which bears against a plate or disk 9 slidably mounted in the end of the recess 5 furthest removed from the gear 2.

A screw 10 extends through the end wall of the recess in longitudinal alinement therewith and serves to vary the position of the disk 9 relatively to the bearing block 6 to adjust the tension of the spring 8. The bearing block 6 is provided in its outer face with a recess 11 which preferably conforms to the segment of a sphere and is of a depth slightly greater than the diameter of the sphere. Loosely mounted in the recess 11 is a rotatable locking part, such as the hard steel ball 12 of a diameter corresponding substantially to the diameter of the recess, and, inasmuch as the recess 11 is of a depth greater than half the diameter of the sphere, the greater portion of the ball 12 is incased within the bearing block 6, while that portion which extends beyond the recess 11 is adapted to engage one of the recesses 3 formed in the gear 2, and, as this recess is of a depth less than half the diameter of the sphere, the edge of the recess will engage the surface of the ball 12 at some distance below the center thereof. The tension of the spring 8 is such as to retain the balls 12 in engagement with the several recesses 3 of the gear 2 and to cause the gear 2 and the clutch member 4 to rotate in unison under normal conditions, but the tension of the spring is so regulated that in case the driven part or mechanism is subjected to an abnormal strain, the spring will compress and allow the balls to escape from the several recesses 3, thus allowing the gear 2 to rotate independently of the clutch member 4.

It will be observed that by providing the rotatable locking parts or balls and making the locking recesses in the gear of a depth less than the diameter of the rotating part, this part is brought into engagement with the edge of the recess at a distance below the center where the lateral inclination is considerable; and further, that when pressure is applied to the rotatable locking part the same will be inclined to rotate about its axis and thus tend to roll up over the edge of the recess, thereby greatly facilitating the operation of the device and minimizing the liability of the locking part binding and refusing to operate or being tardy in operation. It will also be observed that the tendency of the locking part to roll over the edges of the locking recesses entirely eliminates the chipping and wearing away of the edges of the recesses, which is incident to the use of a non-rotating locking part: that this rotation of the locking part further brings all portions of the surface thereof into engagement with the edge of the locking recess, thus equalizing the wear and bringing the strain upon different parts of the roller, thereby prolonging the life and service of the same; and it will further be observed that the construction and arrangement of the parts of my improved gearing is such that the same occupies but little more space than the ordinary gearing and can be readily adapted to the ordinary train of gearing without material changes therein.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a gearing of the character described, the combination, with a shaft, a gear mounted on said shaft and having a recess in one side thereof, a clutch member mounted on said shaft and having a recess in the side adjacent to said gear, one of said members being loosely mounted on said shaft and the other member fixed thereto, of a rotatable locking part loosely supported by one of said members and adapted to automatically engage and disengage the recess in the other member.

2. In a gearing of the character described, the combination, with a shaft, a gear mounted on said shaft and having a recess in one side thereof, a clutch member mounted on said shaft and having a recess in the side thereof adjacent to said gear, one of said members being loosely mounted on said shaft and the other member fixed thereto, of a rotatable locking part loosely supported by one of said members, and yieldable means for retaining said locking part normally in locking engagement with the recess in the other member.

3. In a gearing of the character described, the combination, with a shaft, a gear loosely mounted on said shaft and having a recess in one face thereof, and a clutch member fixed to said shaft, of a rotatable locking part loosely mounted in said clutch member, and yieldable means for retaining the same normally in locking engagement with the recess in said gear.

4. In a gearing of the character described, the combination, with a shaft, a gear mounted on said shaft and having a recess in one side thereof, a clutch member mounted on said shaft and having a recess in the side adjacent to said gear, one of said members being loosely mounted on said shaft and the other member fixed thereto, of a ball carried by one of said members and adapted to engage the recess in the other member.

5. In a gearing of the character described, the combination, with a shaft, a gear loosely mounted on said shaft and having a recess in one face thereof, and a clutch member fixed to said shaft, of a ball carried by said clutch member and adapted to engage the recess in said gear.

6. In a gearing of the character described, the combination, with a shaft, a gear loosely mounted on said shaft and having a recess in one face thereof, and a clutch member fixed to said shaft, of a ball carried by said clutch member and adapted to engage the recess in said gear, and yieldable means for retaining said ball in engagement with said recess.

7. In a gearing of the character described, the combination, with a shaft, and a gear loosely mounted on said shaft and having a recess in one face thereof, of a clutch member fixed to said shaft and having a recess therein, a spring-pressed bearing block mounted in said recess and provided with a seat, and a rotatable locking part loosely mounted in said seat and adapted to engage the recess in said gear.

8. In a gearing of the character described, the combination, with a shaft, and a gear loosely mounted on said shaft and having a recess in one face thereof, of a clutch member fixed to said shaft and having a recess therein, a bearing block slidably mounted in said recess, a spring confined in said recess and engaging said bearing block, means for adjusting the tension of said spring, and a rotatable locking part loosely mounted in said bearing block and adapted to engage the recess in said gear.

9. In a gearing of the character described, the combination, with a shaft, and a gear loosely mounted on said shaft and having a series of recesses in one face thereof, of a clutch member fixed to said shaft and having a series of recesses therein, a spring-pressed bearing block mounted in each of said recesses, a rotatable locking part loosely mounted in each of said bearing blocks and adapted to engage one of the recesses in said gear, the number of recesses in said gear being greater than the number of locking parts.

10. In a gearing of the character described, the combination, with a shaft, a gear mounted on said shaft, and a clutch member mounted on said shaft, one of said members being loosely mounted on said shaft and the other member fixed thereto, of a rotatable locking part loosely mounted in one of said members, the other member having a recess adapted to be engaged by said locking part.

11. In a gearing of the character described, the combination, with a shaft, and a gear loosely mounted on said shaft and having a plurality of recesses in one face thereof, of a clutch member fixed to said shaft having a recess extending substantially parallel to said shaft, a spring-pressed bearing block mounted in said recess and having a bearing formed therein, and a rotatable locking part supported in said bearing and adapted to engage one of the recesses in said gear.

In testimony whereof, I affix my signature in presence of two witnesses.

THOMAS H. GANNON.

Witnesses:
A. C. LINK,
EDWARD S. REED.